(12) United States Patent
Lahav et al.

(10) Patent No.: US 12,411,305 B2
(45) Date of Patent: Sep. 9, 2025

(54) TEMPERATURE COMPENSATED SPACER

(71) Applicant: RAFAEL ADVANCED DEFENSE SYSTEMS LTD., Haifa (IL)

(72) Inventors: Oded Lahav, Atzmon (IL); Omer Stoller, Ein Vered (IL)

(73) Assignee: RAFAEL ADVANCED DEFENSE SYSTEMS LTD., Haifa (IL)

( * ) Notice: Subject to any disclaimer, the term of this patent is extended or adjusted under 35 U.S.C. 154(b) by 138 days.

(21) Appl. No.: 18/266,864

(22) PCT Filed: Mar. 20, 2022

(86) PCT No.: PCT/IB2022/052514
§ 371 (c)(1),
(2) Date: Jun. 13, 2023

(87) PCT Pub. No.: WO2022/269371
PCT Pub. Date: Dec. 29, 2022

(65) Prior Publication Data
US 2024/0272402 A1    Aug. 15, 2024

(30) Foreign Application Priority Data
Jun. 24, 2021   (IL) .......................... 284361

(51) Int. Cl.
*G02B 7/18* (2021.01)
(52) U.S. Cl.
CPC .................... *G02B 7/181* (2013.01)

(58) Field of Classification Search
CPC ...................................................... G02B 7/181
USPC ............................................................ 359/512
See application file for complete search history.

(56) References Cited

U.S. PATENT DOCUMENTS

| 6,631,040 | B1* | 10/2003 | Cox ...................... G02B 7/028 359/819 |
| 9,007,683 | B2* | 4/2015 | Kubala .................. G02B 7/003 359/356 |
| 2016/0018619 | A1* | 1/2016 | Gustafson .............. G02B 7/026 29/525.08 |
| 2016/0246028 | A1* | 8/2016 | Erbe ...................... G02B 7/008 |

* cited by examiner

*Primary Examiner* — Sharrief I Broome
(74) *Attorney, Agent, or Firm* — Rivka Friedman

(57) ABSTRACT

A temperature compensated spacer includes first and second anchoring configurations for anchoring the spacer relative to first and second elements, and a frame providing a mechanical connection between the anchoring configurations. The frame has a polygonal opening with a first diagonal extending across the width of a gap between the elements and a second diagonal extending transversely to the first diagonal. A crossbar is associated with the polygonal opening so as to span the second diagonal. The frame and the crossbar are formed from materials having differing coefficients of thermal expansion. The crossbar is deployed so as to determine a length of the second diagonal such that variation in temperature causes deformation of the frame, thereby varying a length of the first diagonal.

14 Claims, 4 Drawing Sheets

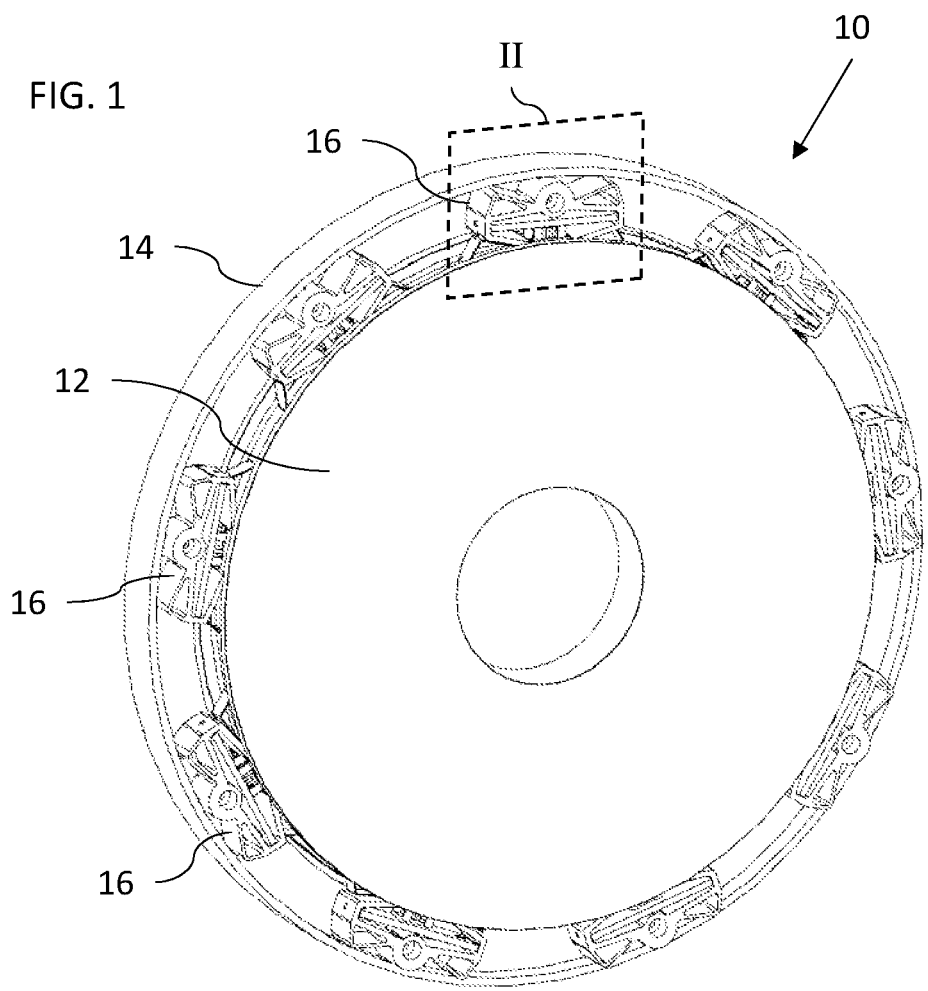
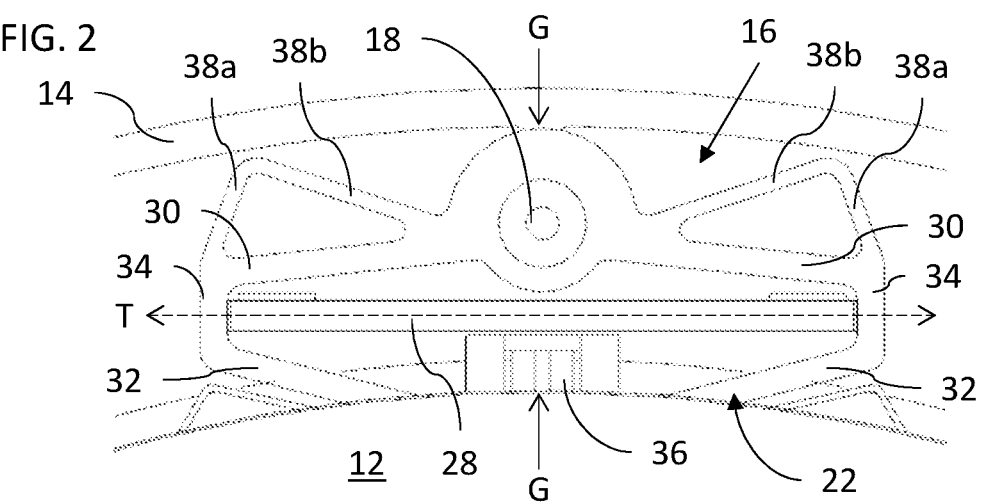

TEMPERATURE COMPENSATED SPACER

FIELD AND BACKGROUND OF THE INVENTION

The present invention relates to a temperature-compensated spacer.

It is known to employ various clips or spacers to suspend one element relative to another, such as an optical element within a support structure. In some cases, optical systems may be exposed to significant variations in operating temperatures, either due to variations in ambient weather conditions or due to operating conditions, for example, for airborne systems. In a typical example of a round mirror made of fused silica mounted on an aluminum support structure, there is a significant mismatch between the coefficients of thermal expansion between the mirror and the support, potentially leading to stress and possible deformation of the optical element, or to loosening of the mounting and possible loss of alignment. If the range of variation in dimensions is accommodated by use of flexible elements, this allows undesirable vibration of the components, which is particularly problematic for movable components and in airborne systems.

SUMMARY OF THE INVENTION

The present invention is a temperature compensated spacer, and assemblies employing such spacers.

According to the teachings of an embodiment of the present invention there is provided, a temperature compensated spacer for mounting a first element relative to a second element where a width of a gap between the first and second elements varies as a function of temperature, the spacer comprising: (a) a first anchoring configuration for anchoring the spacer relative to the first element; (b) a second anchoring configuration for anchoring the spacer relative to the second element; (c) a frame providing a mechanical connection between the first and second anchoring configurations, the frame having a polygonal opening with a first diagonal extending across the width of the gap and a second diagonal extending transversely to the first diagonal; and (d) a crossbar associated with the polygonal opening so as to span the second diagonal, wherein the frame is formed from a first material having a first coefficient of thermal expansion and the crossbar is formed from a second material having a second coefficient of thermal expansion, the crossbar being associated with the second diagonal such that a length of the second diagonal is determined by a dimension of the crossbar, the first and second coefficients of thermal expansion differing such that variation in temperature causes deformation of the frame, thereby varying a length of the first diagonal according to an effective coefficient of thermal expansion greater than both the first and the second coefficients of thermal expansion.

According to a further feature of an embodiment of the present invention, the crossbar is wedged inside the second diagonal of the polygonal opening.

According to a further feature of an embodiment of the present invention, the first coefficient of thermal expansion is at least twice the second coefficient of thermal expansion.

According to a further feature of an embodiment of the present invention, the first coefficient of thermal expansion is at least 7 times greater than the second coefficient of thermal expansion.

According to a further feature of an embodiment of the present invention, the length of the first diagonal varies with temperature with an effective coefficient of thermal expansion in excess of $60 \times 10^{-6}$ per kelvin.

According to a further feature of an embodiment of the present invention, the first material is aluminum and wherein the second material is a ceramic material.

According to a further feature of an embodiment of the present invention, the polygonal opening is a substantially kite-shaped opening.

According to a further feature of an embodiment of the present invention, the polygonal opening is a substantially rhombic opening.

According to a further feature of an embodiment of the present invention, the frame comprises first and second corner regions at opposite ends of the second diagonal, a first pair of arms extending from the first and second corner regions, respectively, towards the first anchoring configuration and a second pair of arms extending from the first and second corner regions, respectively, towards the second anchoring configuration.

According to a further feature of an embodiment of the present invention, the first and second pairs of arms each have a thickness, corresponding to a smallest dimension of the arms, that is measured in a plane parallel to the first and second diagonals, and a width measured perpendicular to the plane that is at least 5 times greater than the thickness.

According to a further feature of an embodiment of the present invention, the first pair of arms is provided with torsion-resisting reinforcements.

According to a further feature of an embodiment of the present invention, at least one of the first and second anchoring configurations comprises a resilient member for resiliently engaging the first or second element.

According to a further feature of an embodiment of the present invention, the resilient member is attached to the frame via an attachment structure which includes flexible elements arranged to accommodate motion of the resilient member relative to the frame in a direction perpendicular to the first and second diagonals.

There is also provided according to the teachings of an embodiment of the present invention, an assembly comprising: (a) a circular optical element having an outer periphery; (b) a support structure circumscribing the outer periphery and spaced from the outer periphery so as to define a gap around the circular optical element; and (c) a plurality of the spacers of claim 1 deployed within the gap so as to suspend the circular optical element relative to the support structure.

BRIEF DESCRIPTION OF THE DRAWINGS

The invention is herein described, by way of example only, with reference to the accompanying drawings, wherein:

FIG. 1 is an isometric view of an assembly in which an optical element is supported relative to a support structure by a plurality of temperature compensated spacers, constructed and operative according to an embodiment of the present invention;

FIG. 2 is a front view of the region of FIG. 1 designated by box II, showing one of the spacers;

DESCRIPTION OF THE PREFERRED EMBODIMENTS

Figure 3A:
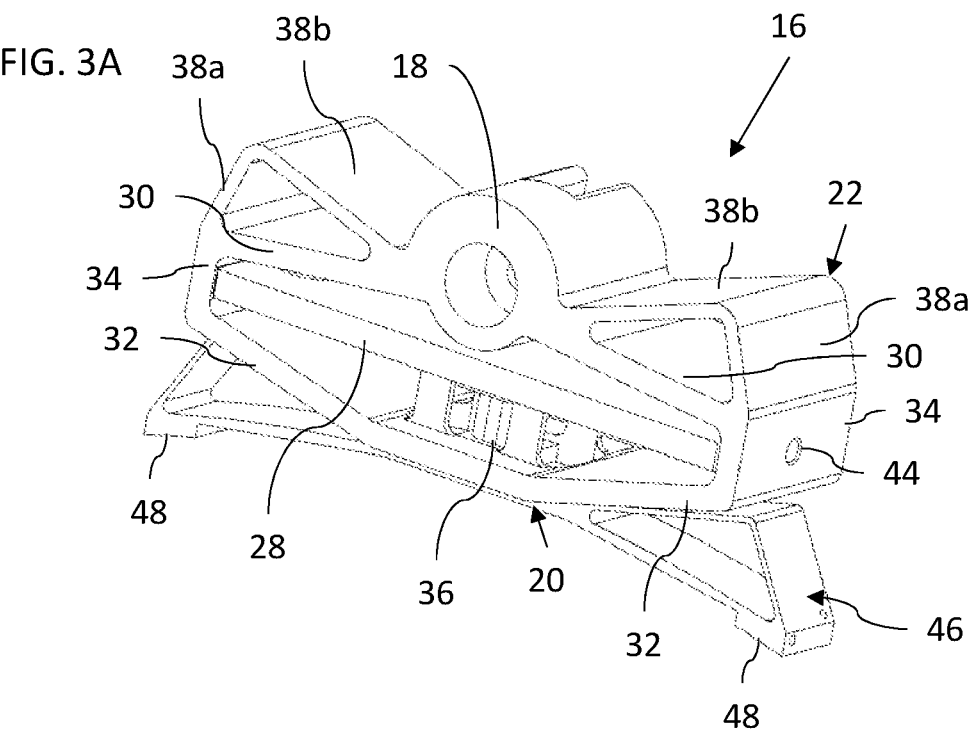
FIGS. 3A and 3B are isometric views of the spacer of FIG. 2 from a front-top view and from a back-bottom view, respectively.

The present invention is a temperature compensated spacer, and assemblies employing such spacers.

The principles and operation of spacers according to the present invention may be better understood with reference to the drawings and the accompanying description.

Referring now to the drawings, FIG. 1 illustrates a typical but non-limiting example of an assembly, generally designated 10, in which an optical element 12 is supported relative to a support structure 14 by a plurality of temperature compensated spacers 16, constructed and operative according to an embodiment of the present invention. In the example illustrated here, optical element 12 is a round element, in this case a mirror, that is suspended within a circular frame, which may in turn be mounted, movably or in a fixed position, relative to additional support structures, not shown. In order to suspend optical element 12 solely by use of spacers 16, at least three spacers are used, deployed around the periphery of optical element 12, and more preferably at least 6 spacers. In the non-limiting example illustrated here, 9 spacers are used, but this number may be varied according to the size of the components and the load which needs to be supported.

The illustrated context of an optical element and a support structure is merely illustrative, and the invention may also be applied to any situation of a first element which needs to be mounted relative to a second element, and where a gap between them varies as a function of temperature.

FIG. 2 shows the deployment of a single spacer 16 within a gap between optical element 12 and support structure 14. The "width" of the gap, indicated here between arrows G, is the direction in which the temperature compensation of the spacer is required, and is taken to be a direction perpendicular to the adjacent surfaces of the optical element 12 and support structure 14 or, in the case of concentric circular elements, corresponds to a radial direction. Arrow T denotes a direction which is transverse to the width of the gap at the location at which the spacer bridges the gap. "Transverse" in this context denotes a direction that is generally cross-ways to the width, and typically perpendicular or near-perpendicular (within ±15 degrees) thereto.

Figure 3B:
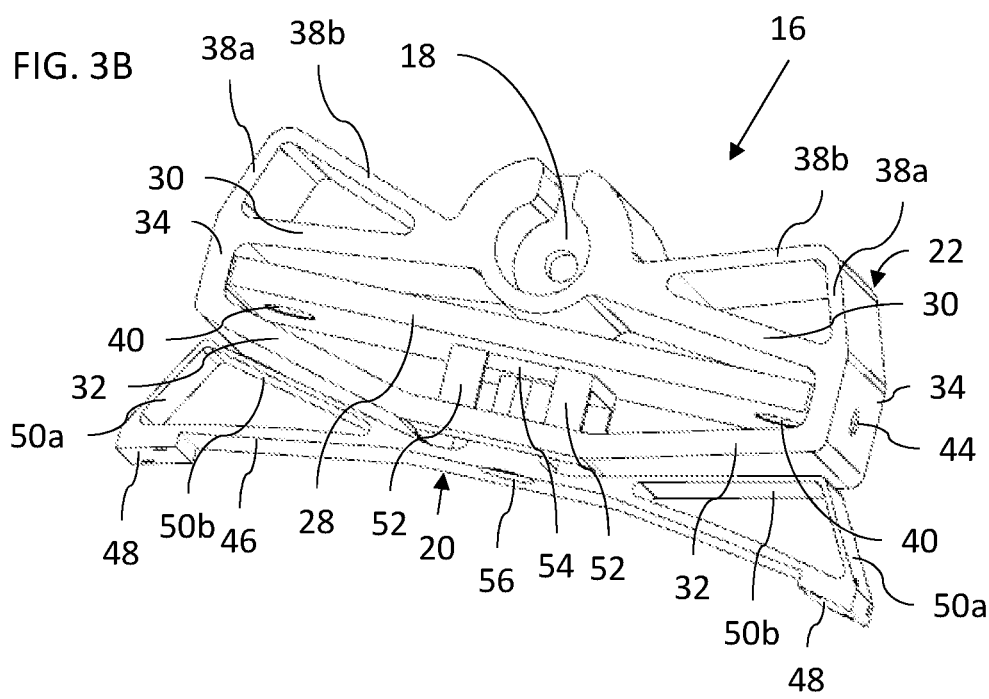

Spacer 16 is shown in FIGS. 3A and 3B. Generally speaking, spacer 16 has a first anchoring configuration 18 for anchoring the spacer relative to a first element (e.g., support structure 14) and a second anchoring configuration 20 for anchoring the spacer relative to a second element (e.g., optical element 12). A frame 22 provides a mechanical connection between the first and second anchoring configurations. The frame 22, shown in FIG. 4 with all detachable elements removed, has a polygonal opening with a first diagonal 24 extending across the width of the gap and a second diagonal 26 extending transversely to the first diagonal. In use, first diagonal 24 is preferably aligned with the width of the gap (G in FIG. 2), and second diagonal 26 is transverse thereto (T in FIG. 2). Referring again to FIGS. 3A and 3B, a crossbar 28 is associated with the polygonal opening so as to span the second diagonal.

It is a particular feature of particularly preferred implementations of the present invention that frame 22 is formed from a first material having a first coefficient of thermal expansion and crossbar 28 is formed from a second material having a second coefficient of thermal expansion. Crossbar 28 is associated with the second diagonal such that a length of the second diagonal is determined by a dimension of the crossbar. The first and second coefficients of thermal expansion differ such that a variation in temperature causes deformation of the frame, thereby varying a length of the first diagonal according to an effective coefficient of thermal expansion greater than both the first and the second coefficients of thermal expansion. Illustrations of a sequence of states corresponding to different temperatures (exaggerated for clarity) are shown in FIGS. 6A-6D.

In the particularly preferred but non-limiting example illustrated here, the polygonal opening of frame 22 is a substantially kite-shaped opening, meaning that, at least in functional terms, it has a first pair of similar length arms 30 forming a first isosceles triangle with crossbar 28 and a second pair of similar length arms 32 forming a second isosceles triangle with crossbar 28. If arms 30 and arms 32 are the same length, the resulting shape is substantially rhombic.

Figure 4:
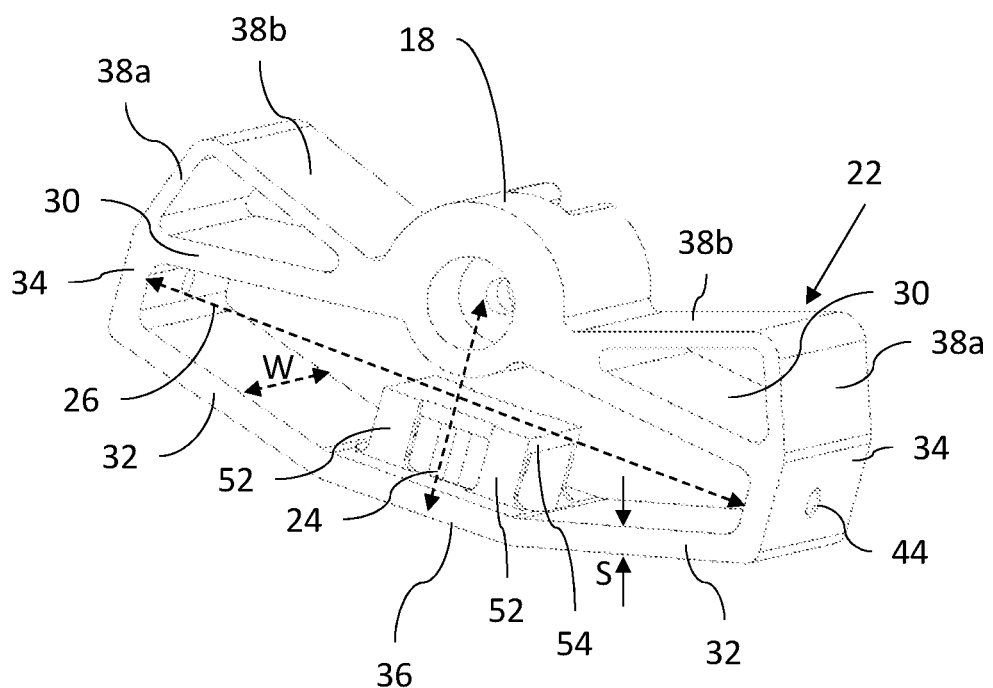
FIG. 4 is an isometric view showing a frame from the spacer of FIG. 2.

Although the kite-shaped or rhombic terminology is useful to describe the functional structure of frame 22, the shape is typically a modified kite-shape or rhombus, where each corner region is modified to accommodate the required interface with other elements. Thus, frame 22 is typically formed with first and second corner regions 34, at opposite ends of the second diagonal, which are flat in order to abut the ends of crossbar 28 without localized stress points. Similarly, first anchoring configuration 18 is shown here as a modified corner, integrated with the converging ends of first pair of arms 30 as a hinge connection to receive a corresponding projecting lug (not shown) from support structure 14. The corner at which second pair of arms 32 meet is also modified to provide an attachment structure 36, described further below, for the second anchoring configuration 20. Wherever a corner region is flattened or otherwise modified, the diagonals 24 and 26 are defined as lines joining between the central regions of the modified corners, as shown in FIG. 4.

Spacer 16 is preferably configured to be relatively rigid, with high resistance to bending and torsional deformation. To this end, first and second pairs of arms 30 and 32 each preferably have an out-of-plane width W (FIG. 4), measured perpendicular to a plane parallel to the first and second diagonals, which is at least 5 times greater than their thickness S (the smallest dimension of the arms, measured in a plane parallel to the first and second diagonals). Additionally, or alternatively, at least one pair of arms is preferably provided with torsion-resisting reinforcements. In the example illustrated here, each arm 30 is integrated with a bridge structure in which two additional wall portions 38a and 38b, each of width W, form together with arm 30 a hollow triangular prism. This imparts enhanced rigidity to arm 30, particularly resistant to torsion deformation.

In order to achieve the desired thermally-actuated displacement, engagement must be maintained between crossbar 28 and corner regions 34 during temperature fluctuations. In certain embodiments, this can be achieved by suitable interengagement of the crossbar and frame, directly or via any suitable attachment configuration. In the particularly preferred implementation illustrated here, crossbar 28 is wedged inside second diagonal 26 of the polygonal opening, between corner regions 34, by employing a frame which, in its unstressed state over the normal range of operating temperatures, has a second diagonal which is shorter than the length of crossbar 28. Assembly of the device can be conveniently achieved by heating frame 22 above the normal range of operating temperatures and/or applying compression force along the first diagonal 24 until the second diagonal increases enough to introduce crossbar 28. On cooling of frame 22 and/or removal of the compression force, crossbar 28 is wedged in place, with preloading of the frame against the crossbar.

Even where such preloading is used, a retention configuration is preferably provided to hold crossbar 28 correctly aligned within frame 22. Where crossbar 28 is formed from ceramic material (according to certain preferred examples described below), the limitations of forming screw threading in ceramics can be avoided by employing threaded plugs 40 which are inserted into corresponding sockets (FIGS. 3B and 5), into which bolts 42 are screwed, thereby retaining crossbar 28 aligned with alignment holes 44 at corner regions 34.

While the spacer of the present invention generally provides temperature compensation while maintaining rigidity, a small degree of resilient flexibility may be advantageous, allowing for situations of transient temperature gradients across the device. The flexibility may also facilitate assembly of the device, and help to accommodate manufacturing tolerances. To this end, at least one of the first and second anchoring configurations, in this case second anchoring configuration 20, includes a resilient member for resiliently engaging the corresponding first or second element.

In the non-limiting but particularly preferred case illustrated here, second anchoring configuration 20 includes a bifurcated leaf spring arrangement 46 which is attached to attachment structure 36 at its center, and which terminates at two contact regions 48. The leaf spring arrangement 46 is here reinforced by a bridge structure with two additional wall portions 50a and 50b, similar to bridge structure 38a and 38b described above, that limits the flexibility and minimizes susceptibility to torsional deformation. The total range of motion allowed by the resilient member is preferably significantly less (preferably less than half, and more preferably less than a third) of the range of displacement covered by spacer 16 through thermal compensation over the designed range of working temperatures (e.g., 25 kelvin).

Second anchoring configuration 20 with bifurcated leaf spring arrangement 46 is most preferably implemented from a material having a coefficient of thermal expansion which is close to that of optical element 12, thereby minimizing thermal stress applied to the optical element 12. For example, where optical element 12 is a mirror made from fused silica, second anchoring configuration 20 with bifurcated leaf spring arrangement 46 may advantageously be made of INVAR 36.

Figure 5:
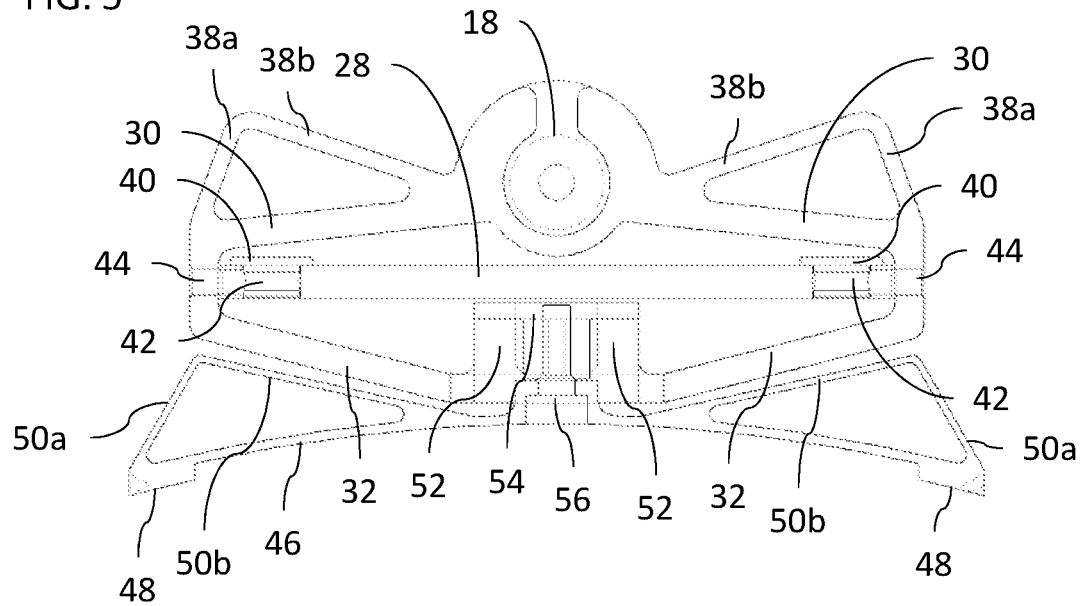
FIG. 5 is a mid-plane cross-sectional view taken through the spacer of FIG. 2.
Figure 6A:
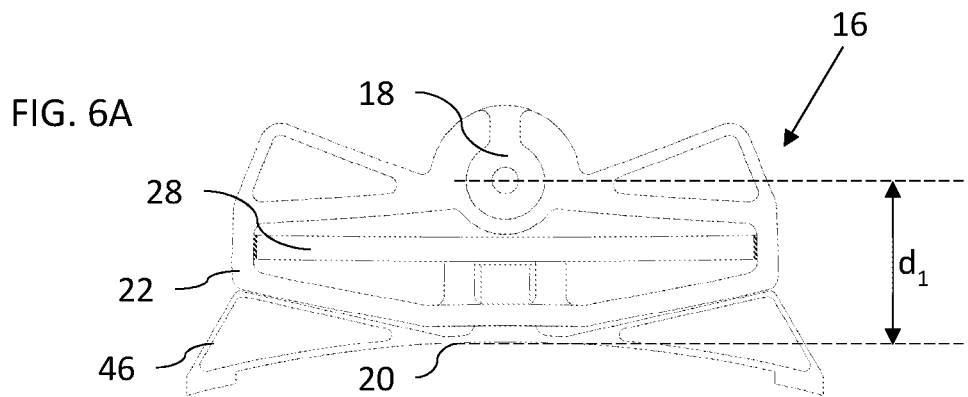
FIGS. 6A-6D are front views of the spacer of FIG. 2 under a sequence of increasing temperature conditions, illustrating a temperature compensation effect of the spacer.
Figure 6B:
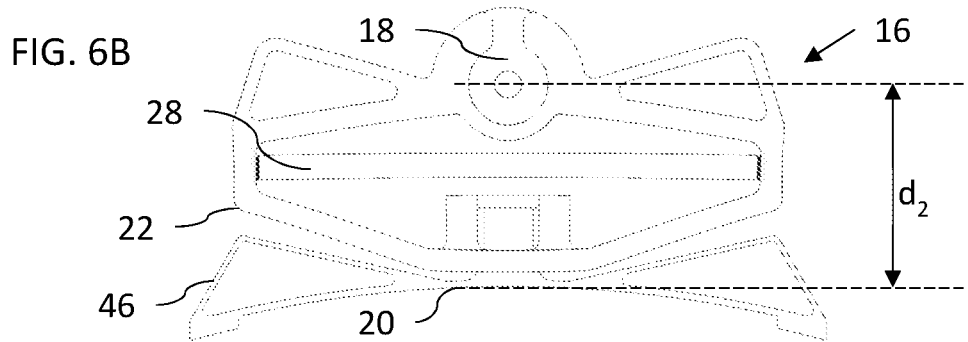
Figure 6C:
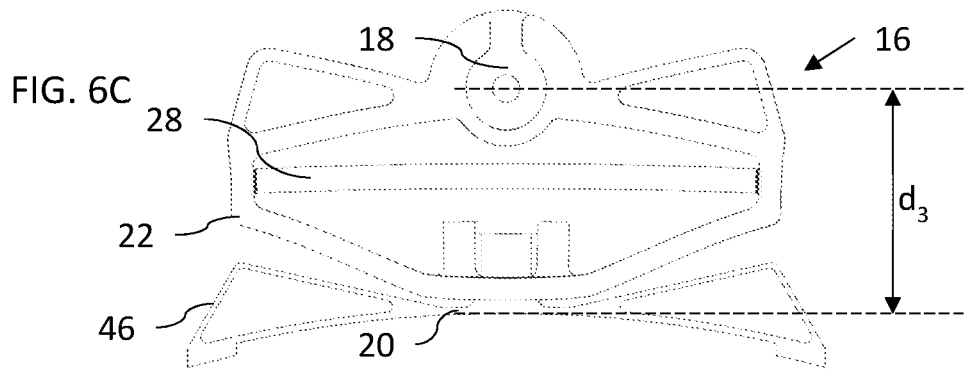
Figure 6D:
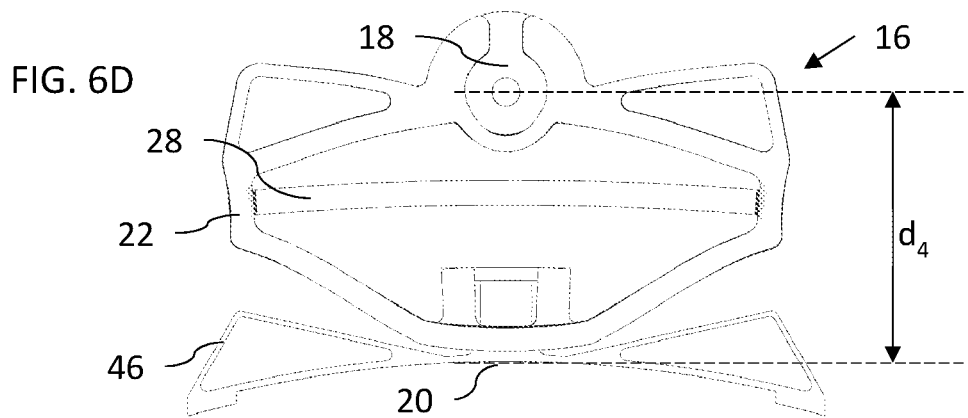

In certain cases, in view of the generally high rigidity of the spacer structure, it has been found helpful to provide limited flexibility for displacement in a direction perpendicular to the first and second diagonals 24 and 26. To this end, the resilient member (leaf spring arrangement 46) is here attached to frame 22 via attachment structure 36 which includes flexible elements 52 arranged to accommodate motion of the resilient member relative to the frame in a direction perpendicular to the first and second diagonals. In the implementation illustrated here, flexible elements 52 are a set of found flexible strips which serves as legs supporting a plate 54 under which a threaded recess is provided for attachment of leaf spring arrangement 46 via a corresponding bolt 56 (FIG. 5). The arrangement of flexible elements 52 and plate 54 forms a parallelogram structure which can be slightly flexed in a direction perpendicular to the diagonals 24 and 26, thereby providing a small range of resilient displacement of leaf spring arrangement 46 relative to frame 22.

EXAMPLE

Turning now to one specific but non-limiting example, we present here an example of a fused silica mirror of radius 195.5 mm that is supported by an aluminum support structure of radius 223.5 mm, defining an initial gap width of 28 mm. The structure is required to accommodate a range of 25 kelvin temperature variation.

It is customary to refer to coefficients of (linear) thermal expansion in units of $10^{-6}$ per kelvin (despite the fact that standard scientific notation would normally adjust the exponential to have only a single digit before the decimal point), since this makes it easier to compare material properties. In order to achieve compensation for temperature variations in the width of the gap, the thermal actuator must achieve a displacement of:

$$\Delta H_{required} = (R_{mount} \cdot \alpha_{al} - R_{mirror} \cdot \alpha_{fused_{silica}}) \cdot \Delta T = 0.1291 \text{ [mm]} \quad \text{(eq. 1)}$$

where $R_{mount}$ and $R_{minor}$ are the radi of the support structure and the mirror, respectively, and $\alpha_{al}$ and $\alpha_{fused\ silica}$ are the coefficients of linear expansion for the materials of the support structure (aluminum) and the mirror (fused silica), respectively.

The actuator must therefore achieve a displacement of 0.13 mm. Since the overall height of the spacer corresponds to the gap size, which is 28 mm, the effective coefficient of linear expansion comes out to $186 \times 10^{-6}$ per kelvin. More generally, various implementations of the present invention preferably achieve a variation in the length of the first diagonal of the spacer that varies with temperature with an effective coefficient of thermal expansion in excess of $60 \times 10^{-6}$ per kelvin, and, in certain cases, in excess of $100 \times 10^{-6}$ per kelvin. This is significantly higher than can be provided by the bulk properties of any available material with suitable mechanical properties for mounting the mirror.

The term "effective coefficient of linear expansion" is used here to refer to the proportional change in length of the first diagonal of the spacer per kelvin temperature change. It is noted that the linear expansion of the first diagonal of the spacer is dependent on the geometry of the frame, and will typically not be a linear function of temperature. For the purpose of the above discussion, the effective coefficient may refer to the value at room temperature.

The materials of the frame and the crossbar are chosen in combination with the geometry of the spacer to provide the required actuator displacement to achieve thermal compensation for each particular application. In certain cases, a first coefficient of thermal expansion that is 2-3 times greater than the second coefficient of thermal expansion may provide optimal results. In other cases, particularly where larger magnitudes of motion are needed, a first coefficient of thermal expansion more than 3 times, and in some cases at least 7 times, greater than the second coefficient of thermal expansion may be advantageous.

By way of non-limiting example, the material of frame 22 may advantageously be chosen to be aluminum, which has a coefficient of linear thermal expansion of about $23.1 \times 10^{-6}$ per kelvin. The material of crossbar may be a specially engineered alloy having a low coefficient of thermal expansion, such as INVAR 36. However, it is particularly preferred to employ a ceramic material, such as silicon carbide, silicon nitride or cordierite. Titanium may be used for the crossbar in certain cases, but provides a relatively smaller differential between the coefficients of thermal expansion, and will therefore provide more limited displacement suitable for certain applications.

It will be appreciated that the above descriptions are intended only to serve as examples, and that many other embodiments are possible within the scope of the present invention as defined in the appended claims.

What is claimed is:

1. A temperature compensated spacer for mounting a first element relative to a second element where a width of a gap between the first and second elements varies as a function of temperature, the spacer comprising:
   (a) a first anchoring configuration for anchoring the spacer relative to the first element;
   (b) a second anchoring configuration for anchoring the spacer relative to the second element;
   (c) a frame providing a mechanical connection between said first and second anchoring configurations, said frame having a polygonal opening with a first diagonal extending across the width of the gap and a second diagonal extending transversely to said first diagonal; and
   (d) a crossbar associated with said polygonal opening so as to span said second diagonal,
wherein said frame is formed from a first material having a first coefficient of thermal expansion and said crossbar is formed from a second material having a second coefficient of thermal expansion, said crossbar being associated with said second diagonal such that a length of said second diagonal is determined by a dimension of said crossbar, said first and second coefficients of thermal expansion differing such that variation in temperature causes deformation of said frame, thereby varying a length of said first diagonal according to an effective coefficient of thermal expansion greater than both said first and said second coefficients of thermal expansion.

2. The spacer of claim 1, wherein said crossbar is wedged inside said second diagonal of said polygonal opening.

3. The spacer of claim 1, wherein said first coefficient of thermal expansion is at least twice said second coefficient of thermal expansion.

4. The spacer of claim 1, wherein said first coefficient of thermal expansion is at least 7 times greater than said second coefficient of thermal expansion.

5. The spacer of claim 1, wherein said length of said first diagonal varies with temperature with an effective coefficient of thermal expansion in excess of $60 \times 10^{-6}$ per kelvin.

6. The spacer of claim 1, wherein said first material is aluminum and wherein said second material is a ceramic material.

7. The spacer of claim 1, wherein said polygonal opening is a substantially kite-shaped opening.

8. The spacer of claim 1, wherein said polygonal opening is a substantially rhombic opening.

9. The spacer of claim 1, wherein said frame comprises first and second corner regions at opposite ends of said second diagonal, a first pair of arms extending from said first and second corner regions, respectively, towards said first anchoring configuration and a second pair of arms extending from said first and second corner regions, respectively, towards said second anchoring configuration.

10. The spacer of claim 9, wherein said first and second pairs of arms each have a thickness, corresponding to a smallest dimension of said arms, that is measured in a plane parallel to said first and second diagonals, and a width measured perpendicular to said plane that is at least 5 times greater than said thickness.

11. The spacer of claim 10, wherein said first pair of arms is provided with torsion-resisting reinforcements.

12. The spacer of claim 1, wherein at least one of said first and second anchoring configurations comprises a resilient member for resiliently engaging the first or second element.

13. The spacer of claim 12, wherein said resilient member is attached to said frame via an attachment structure which includes flexible elements arranged to accommodate motion of said resilient member relative to said frame in a direction perpendicular to said first and second diagonals.

14. An assembly comprising:
   (a) a circular optical element having an outer periphery;
   (b) a support structure circumscribing said outer periphery and spaced from said outer periphery so as to define a gap around said circular optical element; and
   (c) a plurality of the spacers of claim 1 deployed within said gap so as to suspend said circular optical element relative to said support structure.

* * * * *